(12) United States Patent
Jayasekara et al.

(10) Patent No.: US 7,375,931 B2
(45) Date of Patent: May 20, 2008

(54) MAGNETIC RECORDING HEAD WITH ESD SHUNT TRACE

(75) Inventors: Wipul P. Jayasekara, Los Gatos, CA (US); Howard G. Zolla, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 411 days.

(21) Appl. No.: 11/240,542

(22) Filed: Sep. 30, 2005

(65) Prior Publication Data

US 2007/0076328 A1 Apr. 5, 2007

(51) Int. Cl.
G11B 5/33 (2006.01)
(52) U.S. Cl. ...................................... 360/323
(58) Field of Classification Search .............. 360/323, 360/324.12, 327.22; 20/603.01; 252/500
See application file for complete search history.

(56) References Cited

U.S. PATENT DOCUMENTS

| | | | |
|---|---|---|---|
| 6,470,566 B2 | 10/2002 | Hsiao et al. | |
| 6,795,278 B2 | 9/2004 | Ryan, III | |
| 6,867,952 B2 * | 3/2005 | Hasegawa | 360/324.12 |
| 6,914,758 B2 | 7/2005 | Ryan et al. | |
| 7,258,819 B2 * | 8/2007 | Harris, IV | 252/500 |
| 2004/0075955 A1 * | 4/2004 | Ryan et al. | 360/323 |
| 2004/0169966 A1 * | 9/2004 | Shen et al. | 360/327.22 |
| 2004/0180608 A1 | 9/2004 | Church et al. | |
| 2005/0201019 A1 * | 9/2005 | Zhu et al. | 360/323 |
| 2005/0241138 A1 * | 11/2005 | Dill et al. | 29/603.01 |
| 2006/0061913 A1 * | 3/2006 | Sekiguchi et al. | 360/323 |
| 2006/0146450 A1 * | 7/2006 | Beach et al. | 360/323 |
| 2006/0198057 A1 * | 9/2006 | Leung et al. | 360/323 |

* cited by examiner

*Primary Examiner*—Tianjie Chen
(74) *Attorney, Agent, or Firm*—Duft Bornsen & Fishman, LLP

(57) ABSTRACT

Recording heads having an ESD shunt trace and methods of fabricating the same are disclosed. A recording head of the invention includes a first shield, a second shield, an MR read element between the first shield and the second shield, and an ESD shunt trace. The ESD shunt trace is formed from MR layers and is connected to the MR read element and one or both of the first shield and the second shield. One or more of the MR layers forming the ESD shunt trace are processed to reduce the MR properties of the ESD shunt trace. Examples of processing the ESD shunt trace are ion milling, ion implantation, oxidizing, reactive ion etching, sputter etching, wet chemical etching, etc.

25 Claims, 4 Drawing Sheets

MAGNETIC RECORDING HEAD WITH ESD SHUNT TRACE

BACKGROUND OF THE INVENTION

1. Field of the Invention

The invention is related to the field of magnetic disk drive systems and, in particular, to magnetic recording heads having electrostatic discharge (ESD) shunt traces formed from magnetoresistive (MR) layers. More particularly, the ESD shunt traces formed from MR layers are processed to reduce the MR properties of the ESD shunt trace.

2. Statement of the Problem

Many computer systems use magnetic disk drives for mass storage of information. Magnetic disk drives typically include one or more magnetic recording heads (sometimes referred to as sliders) that include read elements and write elements. A suspension arm holds the recording head above a magnetic disk. When the magnetic disk rotates, an air flow generated by the rotation of the magnetic disk causes an air bearing surface (ABS) side of the recording head to ride a particular height above the magnetic disk. The height depends on the shape of the ABS. As the recording head rides on the air bearing, an actuator moves an actuator arm that is connected to the suspension arm to position the read element and the write element over selected tracks of the magnetic disk.

To read data from the magnetic disk, transitions on a track of the magnetic disk create magnetic fields. As the read element passes over the transitions, the magnetic fields of the transitions modulate the resistance of the read element. The change in resistance of the read element is detected by passing a sense current through the read element and then measuring the change in voltage across the read element. The resulting signal is used to recover the data encoded on the track of the magnetic disk.

The most common type of read elements are magnetoresistive (MR) read elements. One type of MR read element is a Giant MR (GMR) read element. GMR read elements using two layers of ferromagnetic material (e.g., NiFe) separated by a layer of nonmagnetic material (e.g., Cu) are generally referred to as spin valve (SV) elements. A simple-pinned SV read element generally includes an antiferromagnetic (AFM) layer, a first ferromagnetic layer, a spacer layer, and a second ferromagnetic layer. The first ferromagnetic layer (referred to as the pinned layer) has its magnetization typically fixed (pinned) by exchange coupling with the AFM layer (referred to as the pinning layer). The pinning layer generally fixes the magnetic moment of the pinned layer perpendicular to the ABS of the recording head. The magnetization of the second ferromagnetic layer, referred to as a free layer, is not fixed and is free to rotate in response to the magnetic field from the magnetic disk. The magnetic moment of the free layer is free to rotate upwardly and downwardly with respect to the ABS in response to positive and negative magnetic fields from the rotating magnetic disk. The free layer is separated from the pinned layer by the spacer layer, which is nonmagnetic and electrically conducting.

Another type of spin valve read element is an antiparallel pinned (AP) SV read element. The AP-pinned SV read element differs from the simple pinned SV read element in that an AP-pinned structure has multiple thin film layers forming the pinned layer instead of a single pinned layer. The AP-pinned structure has an antiparallel coupling (APC) layer between first and second ferromagnetic pinned layers. The first pinned layer has a magnetization oriented in a first direction perpendicular to the ABS by exchange coupling with the AFM pinning layer. The second pinned layer is antiparallel exchange coupled with the first pinned layer because of the selected thickness of the APC layer between the first and second pinned layers. Accordingly, the magnetization of the second pinned layer is oriented in a second direction that is antiparallel to the direction of the magnetization of the first pinned layer.

Another type of MR read element is a Magnetic Tunnel Junction (MTJ) read element. The MTJ read element comprises first and second ferromagnetic layers separated by a thin, electrically insulating, tunnel barrier layer. The barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the MTJ read element, the first ferromagnetic layer has its magnetic moment pinned (referred to as the pinned layer). The second ferromagnetic layer has its magnetic moment free to rotate in response to an external magnetic field from the magnetic disk (referred to as the free layer). When a sense current is applied, the resistance of the MTJ read element is a function of the tunneling current across the insulating layer between the ferromagnetic layers. The tunneling current flows perpendicularly through the tunnel barrier layer, and depends on the relative magnetization directions of the two ferromagnetic layers. A change of direction of magnetization of the free layer causes a change in resistance of the MTJ read element, which is reflected in voltage across the MTJ read element.

GMR read elements and MTJ read elements may be current in plane (CIP) read elements or current perpendicular to the planes (CPP) read elements. Read elements have first and second leads for conducting a sense current through the read element. If the sense current is applied parallel to the major planes of the layers of the read element, then the read element is termed a CIP read element. If the sense current is applied perpendicular to the major planes of the layers of the read element, then the read element is termed a CPP read element.

An MR read element in a recording head is highly susceptible to damage from electrostatic discharge (ESD) during fabrication, during handling, and during use in the field. The handling and use of recording heads may result in a buildup of electrostatic charges on the various elements of the recording head or other objects contacting the recording head. As an example, electrostatic charges may be built up at various steps during wafer processing. When an MR read element is exposed to ESD, or even a voltage or current input larger than that intended under normal operating conditions, referred to as electrical overstress (EOS), the MR read element may be damaged.

One solution to the problem is to connect ESD protection devices to the MR read element. For instance, a resistor may be connected to one or both of the shields proximate to the MR read element to dissipate electrical potentials that can damage the MR read element. The resistors can be made from the same MR layers as the MR read element in the same fabrication steps. Semiconductor diodes can alternatively be connected to the MR read element and to other structures in the recording head, such as the shields, the substrate, or to the other terminal of the MR read element. The diodes can be connected to the read head using conductors that are made from the same MR layers as the MR read element in the same fabrication steps.

Unfortunately, when ESD protection devices or the conductors wiring such devices are fabricated from the same MR layers as the MR read element, stray magnetic fields can switch the resistance state of the ESD protection device. The change in resistance state of the ESD protection device can affect the resistance state of the MR read element, which can interfere with testing, fabrication, and operation of the recording head.

To protect the ESD protection devices from stray magnetic fields, the shields in the recording heads were formed around the ESD protection devices. One drawback to this solution is that it places a lower limit on the size of the shields in the recording heads. It may also limit the ability to lower the overall capacitance of the recording head, which can affect the frequency response characteristics of the recording head. It may also make the recording head more prone to dead shorts between the shield and the MR read element.

It would be desirable to fabricate recording heads with more effective ESD protection devices than those currently proposed.

SUMMARY OF THE SOLUTION

The invention solves the above and other related problems with a magnetic recording head having an ESD shunt trace connected to a magnetoresistive (MR) read element and shields in the recording head to protect the MR read element from ESD damage. The ESD shunt trace is formed from MR layers, as is the MR read element, but the ESD shunt trace is processed to reduce or eliminate the MR properties of the ESD shunt trace. After processing, the ESD shunt trace is advantageously less sensitive to stray magnetic fields, but should effectively protect the MR read element from ESD damage. By being less sensitive to stray magnetic fields, the ESD stunt trace does not have to be shielded.

In one embodiment, a recording head of the invention includes a first shield, a second shield, an MR read element between the first shield and the second shield, and an ESD shunt trace. The ESD shunt trace is formed from MR layers and is connected to the MR read element and one or both of the first shield and the second shield. One or more of the MR layers forming the ESD shunt trace are processed to reduce the MR properties of the ESD shunt trace. Examples of processing the ESD shunt trace are ion milling, ion implantation, oxidizing, reactive ion etching, sputter etching, wet chemical etching, etc. After processing, the ESD shunt trace should be less sensitive to stray magnetic fields.

Another embodiment of the invention is a method of fabricating a recording head having an ESD shunt trace. First, a first shield is formed on an underlayer. Next, an MR read element and an ESD shunt trace are formed from a plurality of MR layers according to any desired fabrication process. After being formed, the ESD shunt trace connects to or contacts the MR read element and one or more of the first shield and the second shield. Next, one or more of the MR layers of the ESD shunt trace are processed to reduce the MR properties of the ESD shunt trace. For instance, one or more layers of ESD shunt trace may be ion milled, ion implanted, oxidized, reactive ion etched, sputter etched, wet chemical etched, etc, to reduce the MR properties of the ESD shunt trace. A protective layer may be formed on the MR read element before the processing step to protect the MR read element from the processing. A second shield is then formed over the MR read element, where it connects to or contacts the ESD shunt trace. The order of the steps described above is just one embodiment, and other fabrication methods according to the invention may have steps in a different order.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
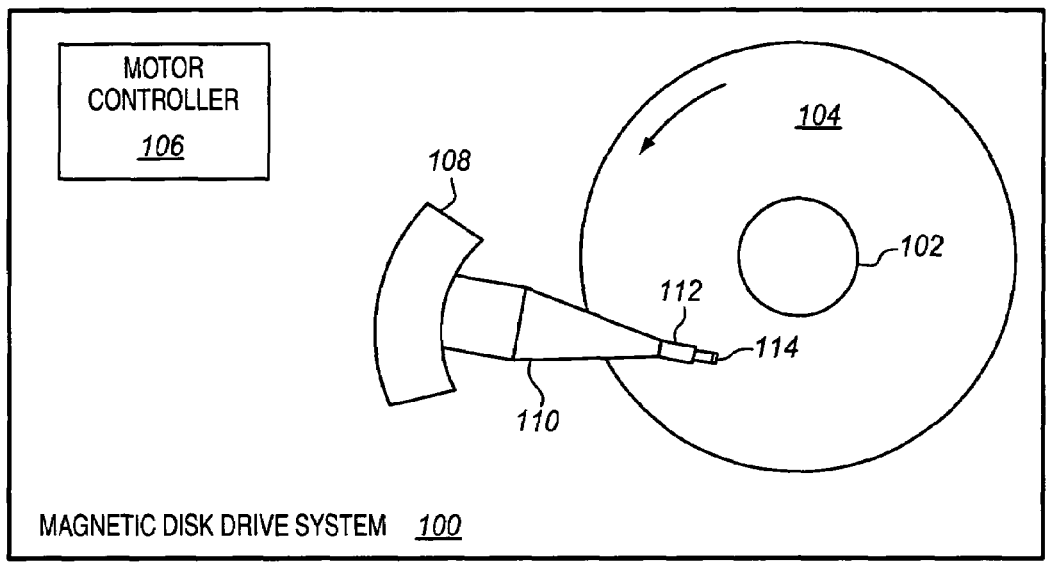
FIG. 1 illustrates a magnetic disk drive system in an exemplary embodiment of the invention.

FIG. 1 illustrates a magnetic disk drive system 100 in an exemplary embodiment of the invention. Magnetic disk drive system 100 includes a spindle 102, a magnetic recording medium 104, a motor controller 106, an actuator 108, an actuator arm 110, a suspension arm 112, and a recording head 114. Spindle 102 supports and rotates a magnetic recording medium 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording head 114 over a desired track of magnetic recording medium 104. Magnetic disk drive system 100 may include other devices, components, or systems not shown in FIG. 1. For instance, a plurality of magnetic disks, actuators, actuator arms, suspension arms, and recording heads may be used.

When magnetic recording medium 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of magnetic recording medium 104.

Figure 2:
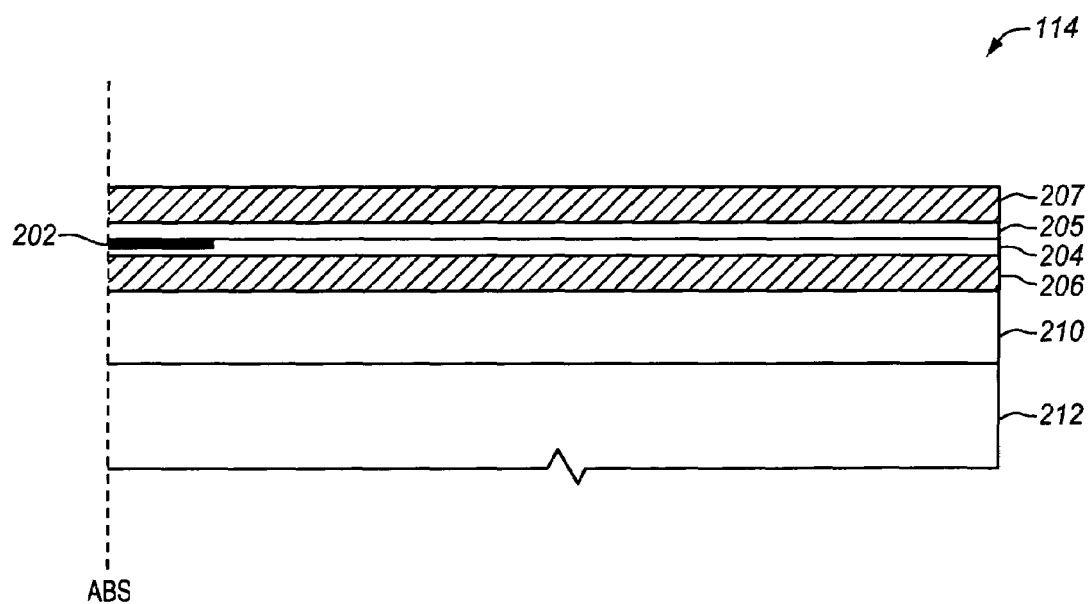
FIG. 2 is a cross-sectional view of the portion of a recording head that includes a magnetoresistive (MR) read element in an exemplary embodiment of the invention.

FIG. 2 is a cross-sectional view of the portion of the recording head 114 that includes a magnetoresistive (MR) read element 202 in an exemplary embodiment of the invention. In recording head 114, read element 202 is sandwiched between two gap layers 204-205. The gap layers 204-205 are sandwiched between two shields 206-207. Shield 206 sits on an underlayer 210, which sits on a substrate 212. Recording head 114 also includes leads and an electrostatic discharge (ESD) shunt trace that will be shown in subsequent figures.

Read element 202 is a CIP read element in this embodiment. If read element 202 were a CPP read element, then there would be conductive material that connects the shields 206-207 to the read element 202, as the shields would also act as the leads.

One edge of the layers of the recording head 114 is lapped to form the ABS. During a read operation, magnetized regions on a rotating magnetic disk adjacent to the ABS inject flux into the read element 202, causing resistance changes in the read element 202. Shields 206-207 absorb unwanted flux, such as fields from neighboring tracks on the magnetic disk, to improve the spatial resolution of the read element 202.

Figure 3:
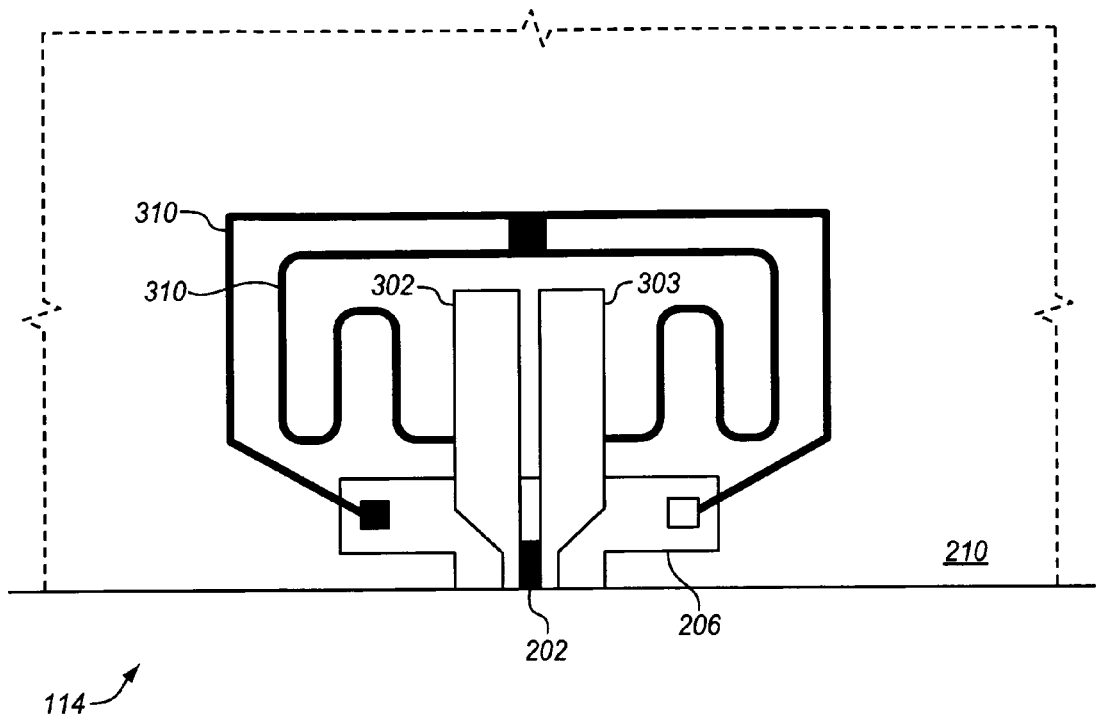
FIG. 3 is a top view of a recording head with an ESD shunt trace in an exemplary embodiment of the invention.

FIG. 3 is a top view of the recording head 114 with an ESD shunt trace in an exemplary embodiment of the invention. Read element 202 sits above shield 206 on a gap layer (not shown). Read element 202 is contacted on either side by leads 302-303. The view in FIG. 3 is during the fabrication process of recording head 114. Shield 207 is not shown in order to show the elements underneath shield 207.

According to the invention, an ESD shunt trace 310 is fabricated in recording head 114. The ESD shunt trace 310 may be fabricated in the same processes used to fabricate MR read element 202 so that added processes are not needed to form the ESD shunt trace 310. ESD shunt trace 310 is formed from a plurality of MR layers, which are the same layers used to form MR read element 202.

The inner serpentine portion of ESD shunt trace 310 contacts lead 302 and lead 303, which in essence connects ESD shunt trace 310 to either side of MR read element 202. The outer portion of ESD shunt trace 310 contacts shield 206 on the left side of FIG. 3 (illustrated as a solid box). The outer portion of ESD shunt trace 310 also contacts shield 207 (see FIG. 2) on the right side of FIG. 3 (illustrated as an open box) when shield 207 is subsequently deposited.

FIG. 3 illustrates just one embodiment of the invention. ESD shunt trace 310 may have other shapes as desired by recording head manufacturers. ESD shunt trace 310 may also have different connectivity within recording head 114 as desired. For instance, ESD shunt trace 310 may contact one lead 302-303 and one shield 206 in another embodiment. ESD shunt trace 310 may contact both of leads 302-303 and one shield 206 in another embodiment. ESD shunt trace 310 may contact one lead 302-303 and both of shields 206-207 in another embodiment.

Because ESD shunt trace 310 is fabricated from the same MR layers as MR read element 202, stray magnetic fields could switch the resistance state of the ESD shunt trace 310. The change in resistance state of the ESD shunt trace 310 could affect the resistance state of MR read element 202, which can interfere with testing, fabrication, and operation of the recording head 114.

To alleviate this problem according to the invention, one or more of the MR layers of ESD shunt trace 310 are processed to reduce the MR properties of the ESD shunt trace 310. For instance, one or more layers of ESD shunt trace 310 may be ion milled, ion implanted, oxidized, reactive ion etched, sputter etched, wet chemical etched, etc, to reduce the MR properties of ESD shunt trace 310. ESD shunt trace 310 may be processed so that the magnetoresistance of the shunt trace 310 falls to less than about 0.25% dR/R. However, the amount of processing may vary depending on desired implementations.

The layers to be processed will typically be the top layers of ESD shunt trace 310. If the free layer is on top, then the free layer and possibly other layers will be processed. If the pinning layer and the pinned layer are on top, then the pinning layer, the pinned layer, and possibly other layers will be processed. The processing of the ESD shunt trace 310 reduces or eliminates the switching of the resistance state in the ESD shunt trace 310.

By reducing the MR properties of ESD shunt trace 310, the ESD shunt trace 310 is less sensitive to stray magnetic fields. Thus, ESD shunt trace 310 should effectively protect the MR read element 202 from ESD damage while not affecting the resistance state of MR read head 210. By being insensitive to stray magnetic fields, ESD stunt trace 310 does not have to be shielded by shields 206-207.

Figure 4:
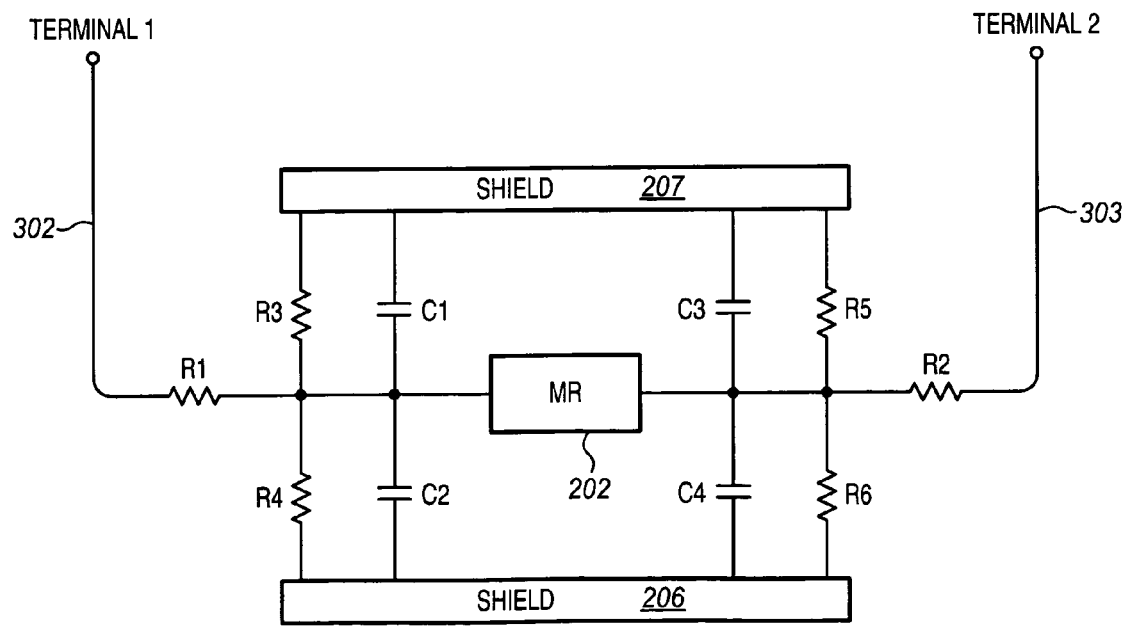
FIG. 4 is a schematic view of a recording head in an exemplary embodiment of the invention.

FIG. 4 is a schematic view of recording head 114 in an exemplary embodiment of the invention. MR read element 202 is shown as being between shields 206-207. Leads 302-303 are illustrated as lines connecting to terminal 1 and terminal 2, respectively. The resistance R1 represents the resistance of lead 302 between the MR read element 202 and terminal 1. The resistance R2 represents the resistance of lead 303 between the MR read element 203 and terminal 2. The capacitances C1-C4 represent the capacitances inherent in CIP read element structures.

The resistances R3-R6 represent the resistances of MR shunt trace 310 as between the leads 302-303 and the shields 206-207. With this configuration, potentials that build up in recording head 114 should be dissipated through one or more of R3-R6 and not permit the development of sufficient potential to breakdown and destroy C1-C4, shorting out the device.

Figure 5:
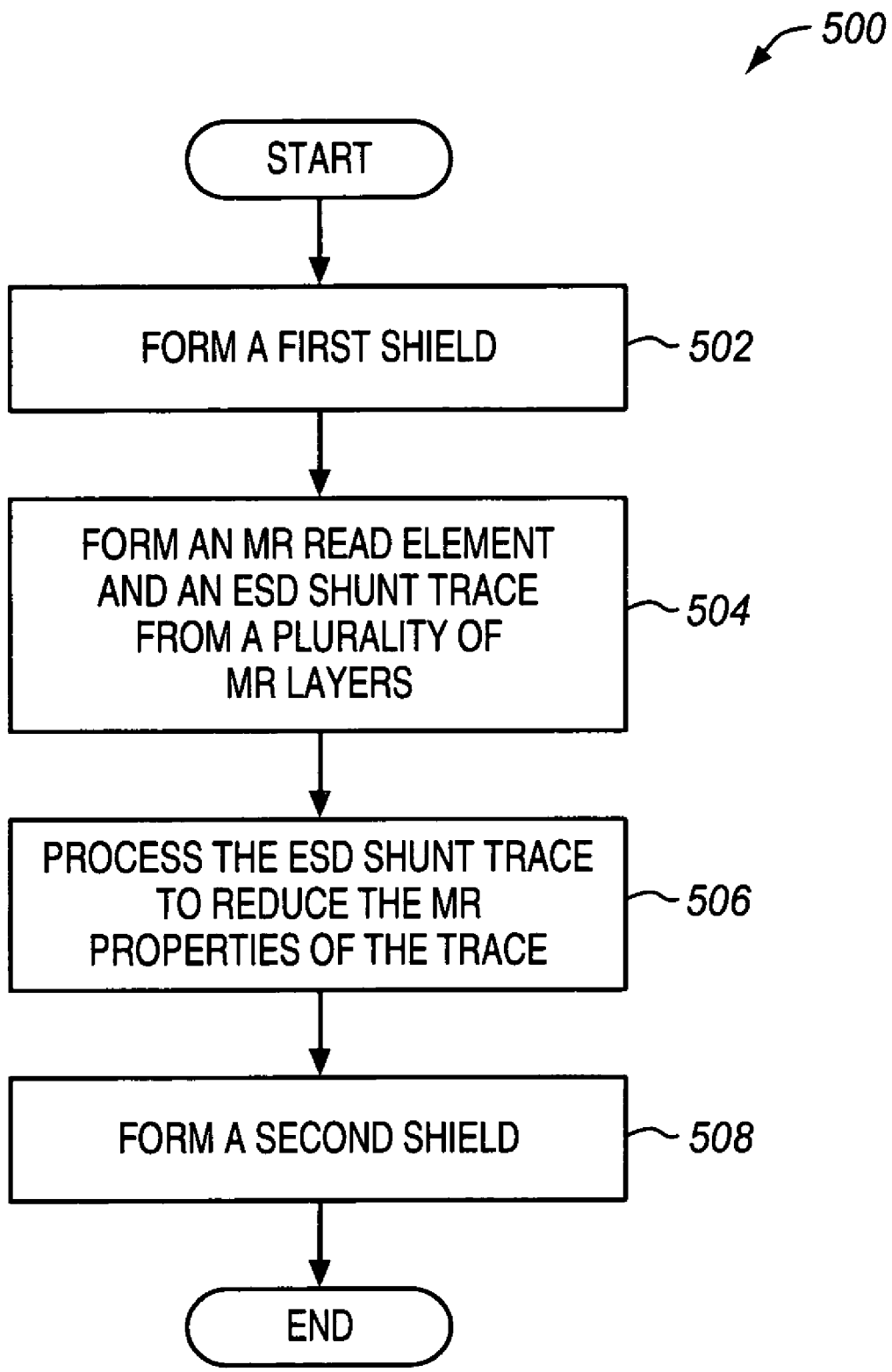
FIG. 5 is a method of fabricating a recording head in an exemplary embodiment of the invention.

FIG. 5 is a method 500 of fabricating a recording head in an exemplary embodiment of the invention. Method 500 is described in relation to recording head 114 shown in FIG. 3, although recording head 114 may be fabricated according to other desired methods.

In step 502, a first shield 206 is formed on an underlayer 210. The first shield 206 may be formed according to many desired deposition and patterning techniques. In step 504, a magnetoresistive (MR) read element 202 and an ESD shunt trace 310 are formed from a plurality of MR layers. MR layers are known in the art as layers having magnetoresistive (MR) properties. Typically, the MR read element 202 and ESD shunt trace 310 are formed by depositing the MR layers, and then patterning the MR read element 202 and the ESD shunt trace 310 with a mask (or vice versa). The layers are then ion milled to remove the unwanted portions of the MR layers to form the MR read element 202 and the ESD shunt trace 310. After being formed, the ESD shunt trace 310 contacts the MR read element 202 and one or more of the first shield 206 and the second shield 207 (see FIGS. 2 and 4).

In step 506, one or more of the MR layers of the ESD shunt trace 310 are processed to reduce the MR properties of the ESD shunt trace 310. For instance, one or more layers of ESD shunt trace 310 may be ion milled, ion implanted, oxidized, reactive ion etched, sputter etched, wet chemical etched, etc, to reduce the MR properties of ESD shunt trace 310. ESD shunt trace 310 may be processed so that the magnetoresistance of the shunt trace 310 falls to less than about 0.25% dR/R. However, the amount of processing may vary depending on desired implementations.

Before this processing step, a protective layer, such as a photoresist protection layer, may be deposited on the MR read element 202. The protective layer would cover the MR read element 202, but leaves the ESD shunt trace 310 exposed. The processing step may also be precise enough that depositing a protective layer is not necessary. In either case, the ESD shunt trace 310 is processed while the MR read element 202 is not processed so that the MR properties of the MR read element 202 are not damaged.

The layers to be processed will typically be the top layers of ESD shunt trace 310. If the free layer is on top, then the free layer and possibly other layers will be processed. If the pinning layer and the pinned layer are on top, then the pinning layer, the pinned layer, and possibly other layers will be processed. The processing of the ESD shunt trace 310 reduces or eliminates the switching of the resistance state in the ESD shunt trace 310.

ESD shunt trace 310 may be processed before or after it is patterned. For instance, when the MR layers are deposited in step 504, the MR read element 202 may then be masked. The unmasked portion of the MR layers may then be processed to reduce the MR properties of the unmasked layers. The ESD shunt trace 310 may then be masked out of the processed MR layers. Finally, a lift-off process may be performed to produce the ESD shunt trace 310 and the MR read element 202.

In step 508, a second shield 207 is formed over the MR read element 202 (see FIGS. 2 and 4). The second shield 207 contacts the ESD shunt trace 310.

Figure 6:
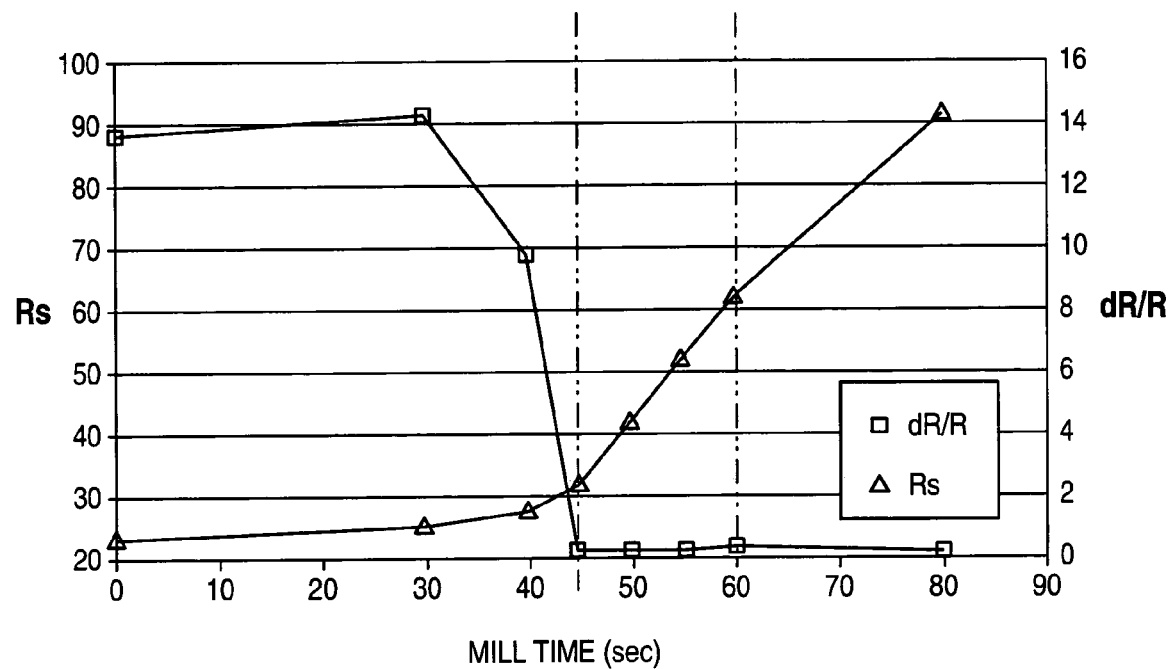
FIG. 6 is a graph illustrating the effect of processing the MR layers according to the method of FIG. 5.

FIG. 6 is a graph illustrating the effect of processing the MR layers according to step 506 of method 500. The processing illustrated in this graph is ion milling. Looking left to right in FIG. 6, as milling time increases, the dR/R of the MR layers reduces to zero. As milling time increases, the sheet resistance (Rs) of the MR layers increase. A desirable range is a milling time of between about 45 and 60 seconds, which results in a sheet resistance between about 30 ohms/square and 70 ohms/square. The desirable range is illustrated as between the vertical dotted lines in FIG. 6.

Although specific embodiments were described herein, the scope of the invention is not limited to those specific embodiments. The scope of the invention is defined by the following claims and any equivalents thereof.

We claim:

1. A magnetic recording head, comprising:
   a first shield;
   a second shield;
   a magnetoresistive (MR) read element between the first shield and the second shield; and
   an ESD shunt trace formed from MR layers and connected to the MR read element and at least one of the first shield and the second shield;
   wherein at least one of the MR layers of the ESD shunt trace are processed to reduce the MR properties of the ESD shunt trace.

2. The magnetic recording head of claim 1 wherein the at least one of the MR layers of the ESD shunt trace are ion milled to reduce the MR properties of the ESD shunt trace.

3. The magnetic recording head of claim 1 wherein the at least one of the MR layers of the ESD shunt trace are ion implanted to reduce the MR properties of the ESD shunt trace.

4. The magnetic recording head of claim 1 wherein the at least one of the MR layers of the ESD shunt trace are oxidized to reduce the MR properties of the ESD shunt trace.

5. The magnetic recording head of claim 1 wherein the at least one of the MR layers of the ESD shunt trace are reactive ion etched, sputter etched, or wet chemical etched to reduce the MR properties of the ESD shunt trace.

6. The magnetic recording head of claim 1 wherein the MR read element comprises either a current in plane (CIP) read element or a current perpendicular to the planes (CPP) read element.

7. A magnetic recording head of a magnetic disk drive system, the recording head comprising:
   a first shield;
   a second shield;
   a magnetoresistive (MR) read element between the first shield and the second shield that is operable to read data from a magnetic disk of the magnetic disk drive system, wherein the MR read element is formed from MR layers; and
   an ESD shunt trace formed from the same MR layers as the MR read element, the ESD shunt trace connects to the MR read element, the first shield, and the second shield;
   wherein at least one of the MR layers of the ESD shunt trace are processed to reduce or eliminate the switching of the resistance state of the ESD shunt trace.

8. The magnetic recording head of claim 7 wherein the at least one of the MR layers of the ESD shunt trace are ion milled to reduce the MR properties of the ESD shunt trace.

9. The magnetic recording head of claim 7 wherein the at least one of the MR layers of the ESD shunt trace are ion implanted to reduce the MR properties of the ESD shunt trace.

10. The magnetic recording head of claim 7 wherein the at least one of the MR layers of the ESD shunt trace are oxidized to reduce the MR properties of the ESD shunt trace.

11. The magnetic recording head of claim 7 wherein the at least one of the MR layers of the ESD shunt trace are reactive ion etched, sputter etched, or wet chemical etched to reduce the MR properties of the ESD shunt trace.

12. The magnetic recording head of claim 7 wherein the MR read element comprises either a current in plane (CIP) read element or a current perpendicular to the planes (CPP) read element.

13. A magnetic disk drive system, comprising:
   a magnetic disk; and
   a recording head comprising:
      a first shield;
      a second shield;
      a magnetoresistive (MR) read element between the first shield and the second shield that is operable to read data from the magnetic disk, wherein the MR read element is formed from MR layers; and
      an ESD shunt trace formed from the MR layers and connected to the MR read element and at least one of the first shield and the second shield;
      wherein at least one of the MR layers of the ESD shunt trace are processed to reduce the MR properties of the ESD shunt trace.

14. The magnetic disk drive system of claim 13 wherein the at least one of the MR layers of the ESD shunt trace are ion milled to reduce the MR properties of the ESD shunt trace.

15. The magnetic disk drive system of claim 13 wherein the at least one of the MR layers of the ESD shunt trace are ion implanted to reduce the MR properties of the ESD shunt trace.

16. The magnetic disk drive system of claim 13 wherein the at least one of the MR layers of the ESD shunt trace are oxidized to reduce the MR properties of the ESD shunt trace.

17. The magnetic disk drive system of claim 13 wherein the at least one of the MR layers of the ESD shunt trace are reactive ion etched, sputter etched, or wet chemical etched to reduce the MR properties of the ESD shunt trace.

18. The magnetic disk drive system of claim 13 wherein the MR read element comprises either a current in plane (CIP) read element or a current perpendicular to the planes (CPP) read element.

19. A method of fabricating a magnetic recording head, the method comprising:
   forming a first shield;
   forming a magnetoresistive (MR) read element and an ESD shunt trace from a plurality of MR layers, wherein the ESD shunt trace contacts the MR read element and the first shield; and
   processing at least one of the MR layers of the ESD shunt trace to reduce the MR properties of the ESD shunt trace.

20. The method of claim 19 wherein processing at least one of the layers of the ESD shunt trace comprises:
   ion milling the at least one of the MR layers.

21. The method of claim 19 wherein processing at least one of the MR layers of the ESD shunt trace comprises:
   ion implanting the at least one of the MR layers.

22. The method of claim 19 wherein processing at least one of the MR layers of the ESD shunt trace comprises:
   oxidizing the at least one of the MR layers.

23. The method of claim 19 wherein processing at least one of the MR layers of the ESD shunt trace comprises:
   reactive ion etching, sputter etching, or wet chemical etching the at least one of the MR layers.

24. The method of claim 19 further comprising:
   forming a protective layer on the MR read element before processing the ESD shunt trace.

25. The method of claim 19 further comprising:
   forming a second shield over the MR read element, wherein the second shield contacts the ESD shunt trace.

* * * * *